United States Patent
Sun et al.

(10) Patent No.: US 9,742,732 B2
(45) Date of Patent: Aug. 22, 2017

(54) DISTRIBUTED TCP SYN FLOOD PROTECTION

(71) Applicants: Yi Sun, San Jose, CA (US); Meng Xu, Los Altos, CA (US); Lee Cheung, Foster City, CA (US); Choung-Yaw Michael Shieh, Palo Alto, CA (US)

(72) Inventors: Yi Sun, San Jose, CA (US); Meng Xu, Los Altos, CA (US); Lee Cheung, Foster City, CA (US); Choung-Yaw Michael Shieh, Palo Alto, CA (US)

(73) Assignee: VARMOUR NETWORKS, INC., Santa Clara, CA (US)

( * ) Notice: Subject to any disclaimer, the term of this patent is extended or adjusted under 35 U.S.C. 154(b) by 356 days.

(21) Appl. No.: 13/794,367

(22) Filed: Mar. 11, 2013

(65) Prior Publication Data

US 2013/0263245 A1 Oct. 3, 2013

Related U.S. Application Data

(60) Provisional application No. 61/685,208, filed on Mar. 12, 2012.

(51) Int. Cl.
*H04L 29/06* (2006.01)

(52) U.S. Cl.
CPC ...... *H04L 63/0209* (2013.01); *H04L 63/1458* (2013.01)

(58) Field of Classification Search
USPC .......................................................... 726/12
See application file for complete search history.

(56) References Cited

U.S. PATENT DOCUMENTS

| | | | |
|---|---|---|---|
| 6,970,459 B1 | 11/2005 | Meier | |
| 6,983,325 B1* | 1/2006 | Watson | H04L 45/24 709/228 |
| 7,742,414 B1 | 6/2010 | Iannaccone et al. | |
| 8,259,571 B1 | 9/2012 | Raphel et al. | |
| 8,798,055 B1 | 8/2014 | An | |
| 2002/0031103 A1 | 3/2002 | Wiedeman et al. | |
| 2002/0032717 A1* | 3/2002 | Malan | H04L 12/2602 718/105 |
| 2003/0123481 A1* | 7/2003 | Neale | H04B 7/18582 370/466 |
| 2003/0135625 A1* | 7/2003 | Fontes | H04L 63/12 709/228 |
| 2004/0030927 A1* | 2/2004 | Zuk | H04L 63/02 713/160 |
| 2004/0062204 A1 | 4/2004 | Bearden et al. | |

(Continued)

*Primary Examiner* — Harris C Wang
(74) *Attorney, Agent, or Firm* — Blakely, Sokoloff, Taylor & Zafman LLP (57) ABSTRACT

A method and apparatus is disclosed herein for TCP SYN flood protection. In one embodiment, a TCP SYN flood protection arrangement comprises a first device operable to process packet input and output functions, including performing sender verification with respect to a connection initiation from a sender for a first TCP connection between the sender and a destination server and a second device, separate from the first device, to perform one or more security processing operations on packets of the first TCP connection from the sender after the first device verifies the sender is legitimate.

20 Claims, 6 Drawing Sheets

(56) References Cited

U.S. PATENT DOCUMENTS

| | | | |
|---|---|---|---|
| 2004/0250124 A1* | 12/2004 | Chesla | G06F 21/552 |
| | | | 726/13 |
| 2005/0201343 A1 | 9/2005 | Sivalingham et al. | |
| 2006/0050696 A1 | 3/2006 | Shah et al. | |
| 2007/0019621 A1 | 1/2007 | Perry et al. | |
| 2009/0268667 A1 | 10/2009 | Gandham et al. | |
| 2010/0235902 A1* | 9/2010 | Guo | H04L 1/1671 |
| | | | 726/12 |
| 2011/0055921 A1* | 3/2011 | Narayanaswamy | H04L 63/1458 |
| | | | 726/22 |
| 2013/0091264 A1* | 4/2013 | Shieh | H04L 63/20 |
| | | | 709/223 |

\* cited by examiner

DISTRIBUTED TCP SYN FLOOD PROTECTION

PRIORITY

The present patent application claims priority to and incorporates by reference the corresponding provisional patent application Ser. No. 61/685,208, titled "Distributed Computer Network Layer Zone Based Security Architecture," filed on Mar. 12, 2012.

FIELD OF THE INVENTION

Embodiments of the present invention are in the field of network security. More particularly, embodiments of the present invention relate to protecting against a TCP SYN flood attack and handling security packet processing in distributed manner.

BACKGROUND OF THE INVENTION

A TCP SYN flood attack is the common attack used by cyber criminals. The attack generates many TCP SYN packets from non-existing senders, which causes servers to waste valuable CPU and memory resources waiting for the next packet of a TCP connection associated with each of those TCP SYN packets. This usage of resources eventually consumes all of the server resources and causes a denial of service.

There are several implementations today to protect against a TCP SYN flood attack in a network security gateway. Typical TCP SYN flood protection includes two parts: the verification of the senders of the TCP SYN packet to initiate a TCP connection and data forwarding between senders and the destination server over the TCP connection. A common way to verify the sender is to use a SYN cookie. The SYN cookie is the mechanism that, after the security gateway receives an initial TCP SYN packet, the security gateway uses a cryptographic function to generate a calculated TCP sequence number in the TCP SYN+ACK packets, each of which is in response to an initial TCP SYN packet. When the security gateway receives the replied packet, the security gateway verifies the TCP sequence number of TCP ACK packet to determine if it's from a legitimate sender. Once the sender is verified, the security gateway initiates another connection to the destination server, completes the TCP three-way handshaking, and then starts forwarding the traffic between sender and destination server. Traditionally, both verification and data forwarding are done in the same security gateway, either in one network appliance or one chassis with multiple blades. But the scalability is limited by how much memory and CPU resources one gateway has.

Even so, large amounts of TCP SYN flood packets could still overwhelm the protection mechanism of a single network security gateway. A single network security gateway, which it is implemented in an appliance, or multiple blades in a chassis, does not have the scalability to protect against a large amount of attack traffic.

SUMMARY OF THE INVENTION

A method and apparatus is disclosed herein for TCP SYN flood protection. In one embodiment, a TCP SYN flood protection arrangement comprises a first device operable to process packet input and output functions, including performing sender verification with respect to a connection initiation from a sender for a first TCP connection between the sender and a destination server and a second device, separate from the first device, to perform one or more security processing operations on packets of the first TCP connection from the sender after the first device verifies the sender is legitimate.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Embodiments of the invention include a distributed mechanism utilizing multiple systems working together to protect against a TCP SYN flood attack. In one embodiment, the multiple systems comprise distributed security gateways that protect against a TCP SYN flood attack. The distributed architecture and the cooperation between multiple security gateways provides great scalability by combining the computation resources and memory storage, thereby forming a scalable protection mechanism that may be utilized to defeat a TCP SYN flood attack.

Embodiments of the invention include a mechanism to defend against a TCP SYN flood attack using distributed security gateways, which extend the scalability and efficiency for the protection. The arrangement of distributed security gateways separate the verification and data forwarding onto multiple devices. The scalability is greatly enhanced and the mechanism can defeat a TCP SYN flood attack of a much bigger scale than that of the prior art.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; and flash memory devices; etc.

Overview

Figure 1:
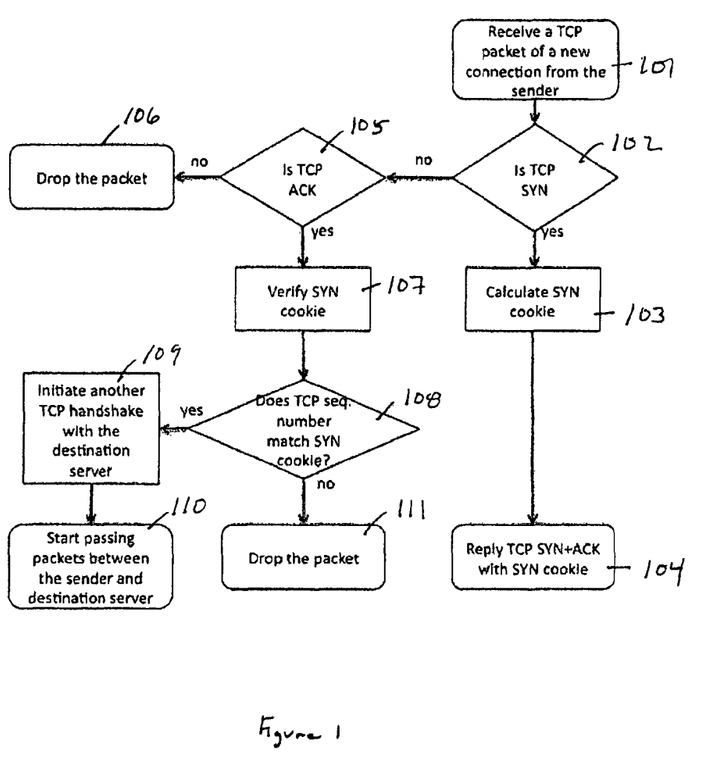
FIG. 1 is a data flow diagram of a TCP SYN flood protection process.

FIG. 1 is a flow diagram of one embodiment of a process for TCP SYN flood attack protection. The process is performed by processing logic that may comprise hardware (circuitry, dedicated logic, etc.), software (such as is run on a general purpose computer system or a dedicated machine), or a combination of both.

Referring to FIG. 1, the process begins by a first security gateway receives a TCP SYN packet from the sender (processing block 101). The sender is a device in a wide area network (e.g., the Internet) that is initiating a connection with a destination server by sending the TCP SYN packet.

In response to the SYN packet, processing logic in the first security gateway tests whether the packet is a TCP SYN packet (processing logic 102). If it is, processing logic in the first security gateway calculates a SYN cookie (processing block 103) and replies with a TCP SYN+ACK packet with the SYN cookie (processing block 104). In one embodiment, the SYN cookie is a calculated TCP sequence number and is put in the TCP SYN+ACK packet. In one embodiment, the calculated TCP sequence number is a hash or other cryptographic function of a timestamp and IP header information, and is calculated in a manner well-known in the art.

In response to the TCP SYN+ACK packet from the first security gateway, the sender replies with a TCP ACK packet containing the next TCP sequence number. Processing logic in the first security gateway receives the TCP ACK packet and determines if it is a TCP ACK packet (processing block 105). If it is, processing logic in the first security gateway verifies the TCP sequence number in TCP ACK packet from the sender (processing block 107) and determines if the TCP sequence number matches the SYN cookie (processing block 108). If not, the packet is dropped.

If the first security gateway confirms the TCP sequence number in the TCP ACK packet matches the SYN cookie, confirming the TCP handshaking is from a valid sender, then processing logic in the first security gateway (or a second separate security gateway) initiates another three-way TCP handshaking between a second security gateway and the destination server (processing block 109) and thereafter packets are passed between the sender and the destination server via the second security gateway (processing block 110). In essence, the second security gateway acts as a proxy to proxy the packets from the sender to the first security gateway and from second security gateway to the destination server. In one embodiment, this is performed by calculating the offset of the TCP sequence number between the sender to first gateway, and from second security gateway to the destination server. It then applies the offset to increment or decrement the TCP sequence number when forwarding the traffic.

In contrast to the prior art, the validation of sender and forwarding of packets between two TCP connections are processed in different devices, which is either a network appliance or a chassis comprised of multiple blades. The limitation prevents the TCP SYN flood protection of the prior art to scale to counter large amount of the attack traffic.

Figure 2:
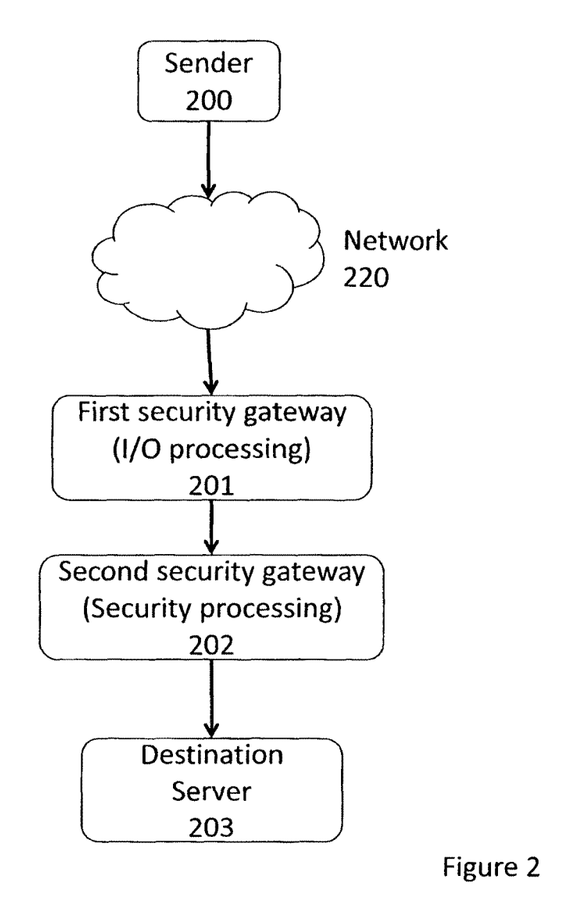
FIG. 2 is a block diagram of one embodiment of a network having multiple layers of network security gateways operating in a distributed arrangement.

FIG. 2 is a block diagram of one embodiment of a network having multiple network security gateways operating in a distributed arrangement to perform packet processing as described herein, along with their prospective protected hosts, or destination servers (one or more networks). Referring to FIG. 2, security gateways 201 and 202 are separate devices. Security gateways 201 and 202 are coupled to a host 203 (e.g., a destination server). Note that there may be more hosts coupled to each of security gateways 201 and 202.

Security gateway 201 includes an I/O module that is operable to process packet input and output functions. In one embodiment, I/O module may comprise hardware, software, or a combination of both. When security gateway 201 receives a SYN packet of a new connection from sender 200, the I/O module performs the attack detection described herein, including performing sender verification with respect to a connection initiation from a sender, such as sender 200, for a first TCP connection between sender 200 and a destination server (e.g., a host). The I/O module is also responsible for creating a session and recording the state information in the session for the life of the connection. The session information includes all run-time states and metadata about the connection and are used to apply the security policy to the connection. In one embodiment, the session information includes a source IP address, destination IP address, port number, source port indication, and destination port indication. In one embodiment, the session information also includes information indicating the incoming interface/port (upon which packet a session is recorded), information indicating the outgoing interface/port (upon which a packet is sent after performing security processing has been applied to it), TCP sequence number, and routing domain. In one embodiment, the run-time state information includes application type information (e.g., Facebook, bitTorrent, Skype, or Dropbox).

Security gateway 202, which is separate from security gateway 201, performs one or more security processing operations on packets of the first TCP connection from sender 200, after security gateway 201 verifies sender 200 is legitimate. In one embodiment, security gateway 202 includes one or more security processing modules, which may comprise hardware, software, or a combination of both, to perform one or more security processing functions, such as, for example, stateful firewall, NAT, VPN, DPI, and/or anti-virus, etc. A security processing module receives packets and runs the packets through one or more various security functions for security processing. Security gateway 202 may include several security modules and each handles the same or different security functions.

In one embodiment, after security gateway 201 verifies sender 200 is legitimate, security gateway 201 or security gateway 202 is operable to use the sender 200 as the source IP address to establish a second TCP connection with destination server 204. In one embodiment, security gateway 201 sends security gateway 202 the TCP sequence numbers of the first TCP connections, and security gateway 202 uses the information to calculate the offset of the TCP sequence number between these two connections. More particularly, the offset of the TCP sequence number of the first and second TCP connections is calculated from the difference of TCP sequence number of the two connections. TCP sequences number are changed with the offset when proxy packets between the two connection after security processing. It then acts as a proxy to pass packets between sender 200 and destination server 204. Security gateway 202 is operable to forward packets between the first and second TCP connections by changing sequence numbers for packets being sent in both directions between sender 200 and destination server 204. In this manner, gateway 202 only receives traffic from verified sending devices.

Figure 3:
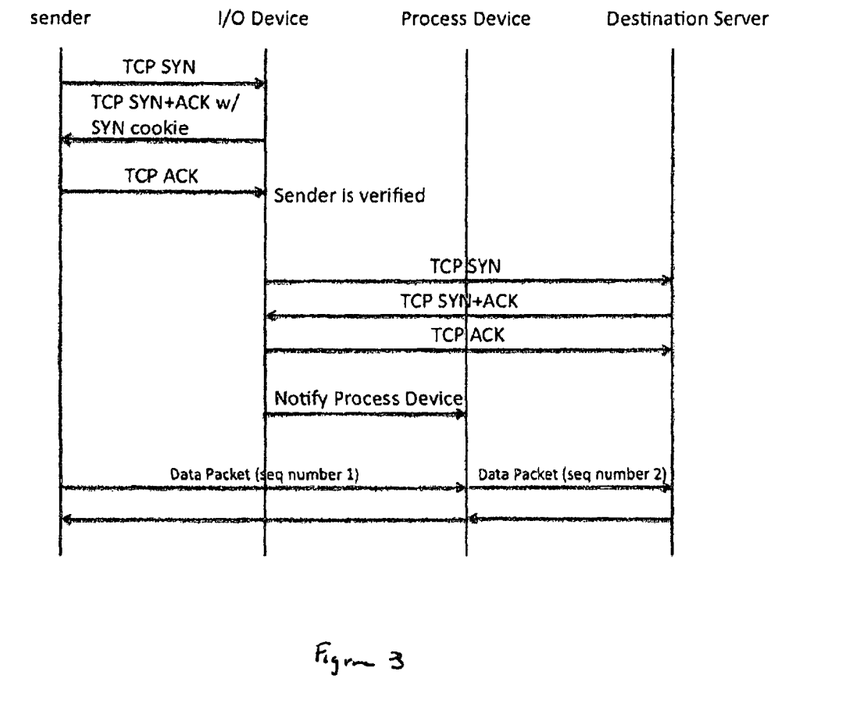
FIG. 3 is a perspective view of the distributed TCP SYN flood protection.

FIG. 3 illustrates one embodiment of the distributed TCP SYN flood protection mechanism. Referring to FIG. 3, the mechanism is comprised of one or more I/O devices and one or more process devices, where the I/O devices process packet input and output functions and process devices handle security processing functions. In one embodiment, multiple I/O devices interconnect with multiple process devices. The mechanism divides the TCP SYN flood protection into 2 tasks: attack detection and security processing. The attack detection is performed in I/O devices.

Once an I/O device verifies a connection is from a legitimate sender, either the I/O device or the process device performs a TCP three-way handshaking with the destination server to establish another TCP connection to the destination server. The decision of where to perform the TCP handshaking could depend on the workload or the computing resources of the I/O and process devices. In the case of the I/O device establishing the second TCP connection, the I/O device informs the process device of the offset of TCP sequence numbers between the first and second TCP connections. Once it have the offset of TCP sequence numbers between the two TCP connections, the process device start forwarding packets between these two connections by changing the sequence number of the offset on both directions.

In further detail, still referring to FIG. 3, the separation of sender verification and the security processing provides great scalability to extend the protection to multiple devices, which provide capability to deal with large amounts of attack traffic. Since I/O devices only deal with sender verification, each I/O device only needs to inspect a few packets of each connection and spends most of CPU resources to verify the sequence number in the TCP ACK packet received as a reply. Process devices are protected from attack traffic since only traffic from validated senders are forwarded to the process devices.

The advantages of embodiments of the present invention include, without limitation, providing great scalability in protecting against large TCP SYN flood attacks. One could deploy a large amount of I/O devices to verify the sender by operating a TCP SYN cookie or TCP SYN proxy, and have small number of process devices for valid connection processing (e.g., security processing). Most security gateways have limited processing units in handling security and computing functions, and overloading processing units would greatly impact the performance and stability of a security gateway. Embodiments of the invention separate verification functions from data processing functions, which makes the defense more robust and scalable to avoid the issue.

In broad embodiment, embodiments of the present invention is to enable the distributed security functions without traditional limitation that all security functions must be processed in the same hardware. By separating I/O and security processing functions, a scalable architecture having multiple hardware devices that cooperate in dealing with a large-scale attack.

One Embodiment of a Security Gateway

In one embodiment, each security gateway comprises a memory, a network interface, a second interface and a processor. The network interface exchanges network traffic from the one or more senders and destination servers, or hosts. The processor performs sender verification or security processing operations as described herein.

Figure 4:
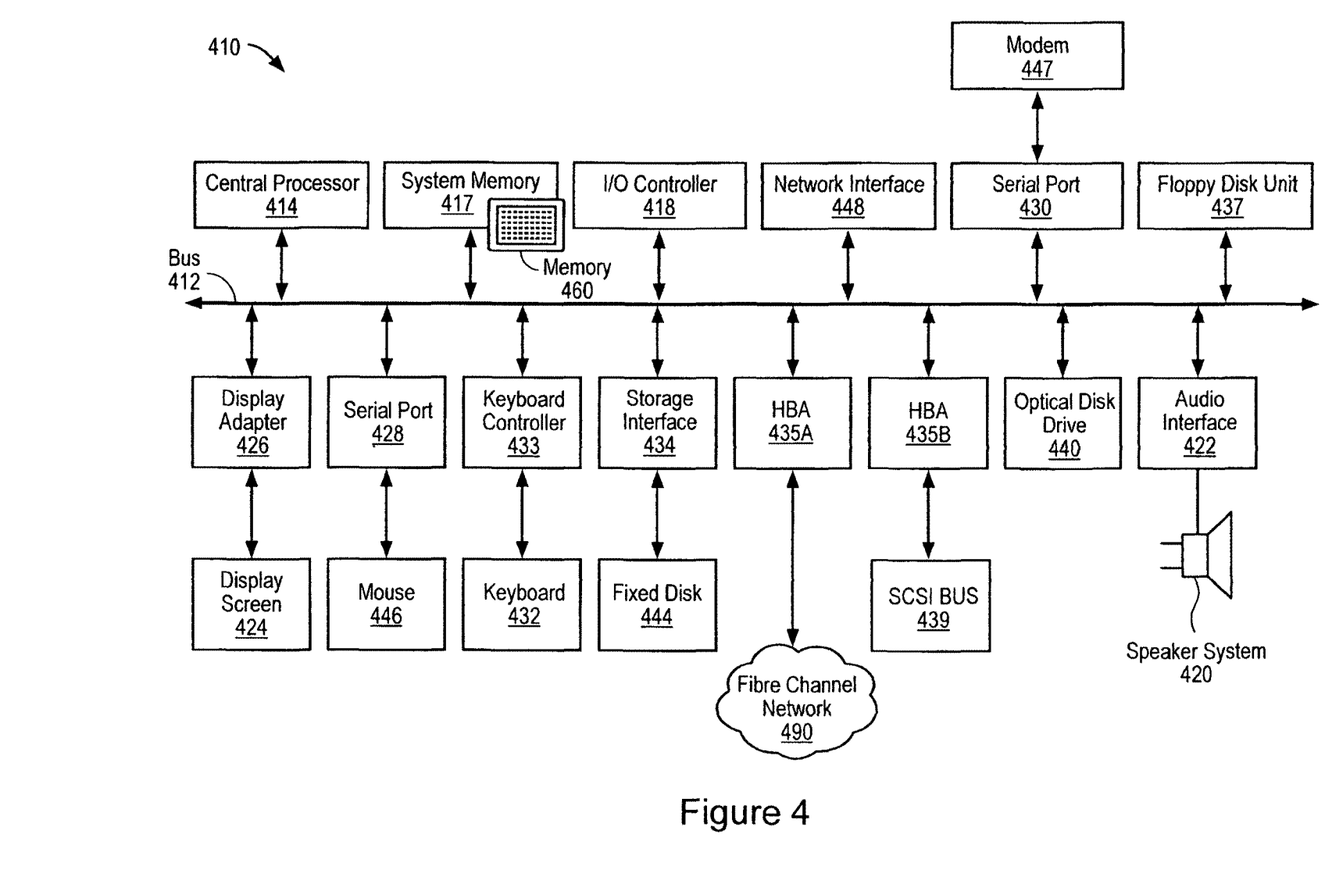
FIG. 4 depicts a block diagram of one embodiment of a security gateway.

FIG. 4 depicts a block diagram of one embodiment of a security gateway, such as security gateway 201 or 202 of FIG. 2. Referring to FIG. 4, security gateway 410 includes a bus 412 to interconnect subsystems of security gateway 410, such as a processor 414, a system memory 417 (e.g., RAM, ROM, etc.), an input/output controller 418, an external device, such as a display screen 424 via display adapter 426, serial ports 428 and 430, a keyboard 432 (interfaced with a keyboard controller 433), a storage interface 434, a floppy disk drive 437 operative to receive a floppy disk 438, a host bus adapter (HBA) interface card 435A operative to connect with a Fibre Channel network 490, a host bus adapter (HBA) interface card 435B operative to connect to a SCSI bus 439, and an optical disk drive 440. Also included are a mouse 446 (or other point-and-click device, coupled to bus 412 via serial port 428), a modem 447 (coupled to bus 412 via serial port 430), and a network interface 448 (coupled directly to bus 412).

Bus 412 allows data communication between central processor 414 and system memory 417. System memory 417 (e.g., RAM) may be generally the main memory into which the operating system and application programs are loaded. The ROM or flash memory can contain, among other code, the Basic Input-Output system (BIOS) which controls basic hardware operation such as the interaction with peripheral components. Applications resident with computer system 410 are generally stored on and accessed via a computer readable medium, such as a hard disk drive (e.g., fixed disk 444), an optical drive (e.g., optical drive 440), a floppy disk unit 437, or other storage medium.

Storage interface 434, as with the other storage interfaces of computer system 410, can connect to a standard computer readable medium for storage and/or retrieval of information, such as a fixed disk drive 444. Fixed disk drive 444 may be a part of computer system 410 or may be separate and accessed through other interface systems.

Modem 447 may provide a direct connection to a remote server via a telephone link or to the Internet via an internet service provider (ISP) (e.g., servers 101, 111-114 of FIG. 1). Network interface 448 may provide a direct connection to a remote server such as, for example, servers 111-114 of FIG. 1. Network interface 448 may provide a direct connection to a remote server (e.g., server 101 of FIG. 1) via a direct network link to the Internet via a POP (point of presence). Network interface 448 may provide such connection using wireless techniques, including digital cellular telephone connection, a packet connection, digital satellite data connection or the like.

Many other devices or subsystems (not shown) may be connected in a similar manner (e.g., document scanners, digital cameras and so on). Conversely, all of the devices shown in FIG. 4 need not be present to practice the techniques described herein. The devices and subsystems can be interconnected in different ways from that shown in FIG. 4. The operation of a computer system such as that shown in FIG. 4 is readily known in the art and is not discussed in detail in this application.

Code to implement the security gateway operations described herein can be stored in computer-readable storage media such as one or more of system memory 417, fixed disk 444, optical disk 442, or floppy disk 438. The operating system provided on computer system 410 may be MS-DOS®, MS-WINDOWS®, OS/2®, UNIX®, Linux®, or another known operating system.

Figure 5:
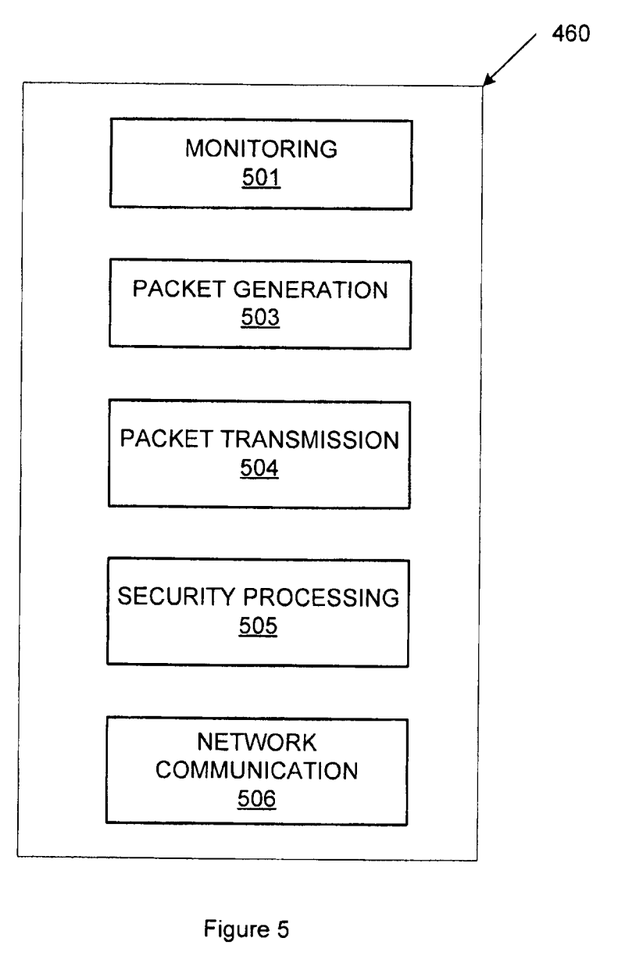
FIG. 5 illustrates a set of programs and data that is stored in memory of one embodiment of a security gateway.
Figure 6:
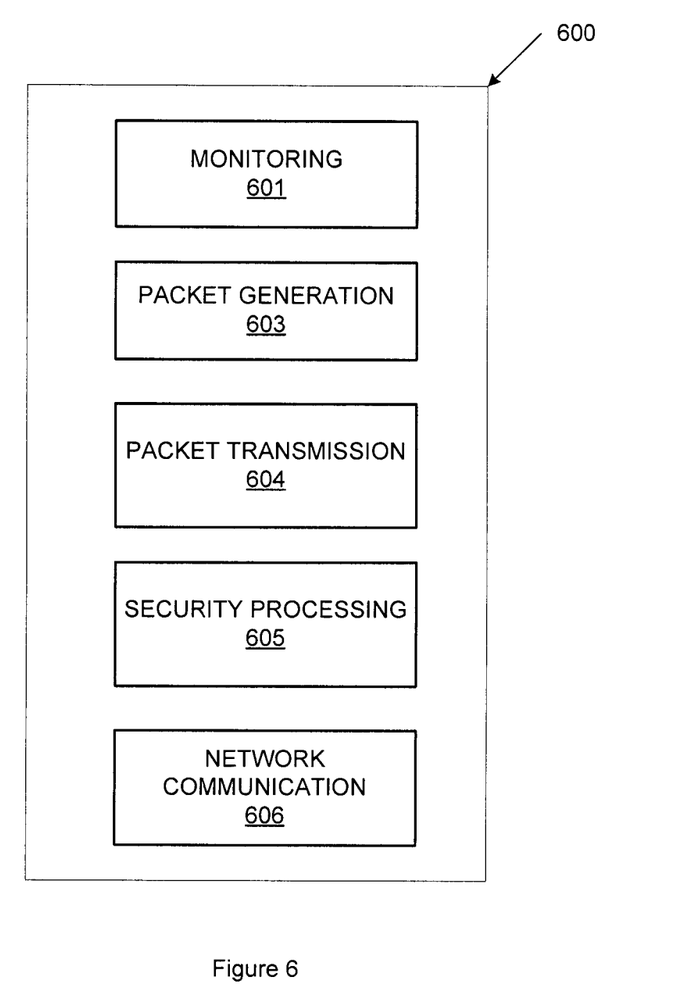
FIG. 6 illustrates another set of programs and data that is stored in memory of one embodiment of another security gateway.

FIGS. 5 and 6 illustrates sets of code (e.g., programs) and data that is stored in memory of one embodiment of a security gateway, such as the security gateway set forth in FIG. 4. The security gateway uses the code, in conjunction with a processor, to implement the necessary operations (e.g., logic operations) to implement the described herein. FIG. 5 illustrates the code and data that is stored in a security gateway such as security gateway 201 of FIG. 2, while FIG. 6 illustrates the code and data that is stored in a security gateway such as security gateway 202 of FIG. 2.

Referring to FIG. 5, the memory 460 includes a monitoring module 501 which when executed by a processor is responsible for performing traffic monitoring of traffic from the network and hosts (e.g., destination servers) as described above. The memory stores a packet generation module 503 which, when executed by a processor, is responsible for generating packets to initiate another TCP connection with a host (destination server) and packets with session information contained therein or with session information encapsulated therewith. Memory 460 also stores packet transmission module 504, which when executed by a processor causes a packet to be sent to sending devices (e.g., sender 200) and hosts (e.g., destination servers) using, for example, network communications. Memory 460 also includes a sender verification module 505 to perform security processing on packets that are part of the migrated session or other sessions. The memory also includes a network communication module 506 used for performing network communication and communication with the other devices (e.g., servers, clients, etc.).

FIG. 6 illustrates a set of code (e.g., programs) and data that is stored in one of those memories. In one embodiment of the security gateway, such as implemented using the system shown in FIG. 4, the server uses the code, in conjunction with the processor, to implement the necessary operations to implement security processing depicted above, such as, for example, the operation set forth in FIG. 2.

Referring to FIG. 6, the memory 600 includes a monitoring module 601 which when executed by a processor is responsible for performing traffic monitoring of traffic from the network or security gateways as described above. The memory stores a packet generation module 603 which, when executed by a processor, is responsible for generating a reply packet to confirm receipt of the session information, thereby indicating the security gateway is taking over the security processing of the session, as well as packets to be sent from hosts (e.g., destination servers) to sending devices (e.g., sender 200). Memory 460 also stores packet transmission module 604, which when executed by a processor causes a packet, such as, for example, the reply packet, to be sent to a security gateway using, for example, network communications and a packet from to be sent from hosts (e.g., destination servers) to sending devices (e.g., sender 200). Memory 460 also includes a security processing module 605 to perform security processing on packets that are part of the migrated session or other sessions. The memory also includes a network communication module 606 used for performing network communication and communication with the other devices (e.g., servers, clients, etc.).

As described above, the hosts in FIG. 2, such as hosts 221-225, and/or the sending devices, such as sender 200, may be implemented using a computer system. In one embodiment, these are implemented using a system such as depicted in FIG. 4 as well, except using different code to implement the techniques and operations performed by such devices. The code is stored in computer-readable storage medium such as system memory 417, fixed disk 444, optical disk 442 or floppy disk 448.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A distributed TCP SYN flood protection arrangement comprising:
 a first device, wherein the first device is a hardware device, that processes packet input and output functions for sender verification of new TCP connections, including performing sender verification with respect to a connection initiation from a sender for a first TCP connection with the first device for communicating TCP packets between the sender and a destination server and capturing session information comprising a first sequence number of the first TCP connection, run-time data indicative of an application type establishing the new TCP connections, and metadata that describes the new TCP connections; and
 a second device, wherein the second device is a hardware device separate from the first device, that performs security processing operations for TCP connections following sender verification by the first device, wherein the second device: receives session information captured by the first device, receives TCP packets forwarded by the first device to the second device from the first TCP connection after the first device verifies the sender is legitimate, establishes a second TCP connection with the destination server using the sender as the source of the second TCP connection including determining an offset based on a difference of the first sequence number and a second sequence number for the second TCP connection, performs one or more security processing operations on the TCP packets of the first TCP connection received from the sender based on the session information and content of the TCP packets, modifies the first sequence number for the TCP packets based on the offset, and provides the TCP packets to the destination server using the second TCP connection based on results of the security processing operations.

2. The arrangement defined in claim 1 wherein, after the first device verifies the sender is legitimate, one of the first device and the second device uses the sender's IP address as the source IP address to establish a second TCP connection with the destination server.

3. The arrangement defined in claim 2 wherein the first device sends the second device the TCP sequence numbers of the first and second TCP connections, and the second device acts as a proxy to pass packets between the sender and the destination server.

4. The arrangement defined in claim 3 wherein the second device forwards packets between the first and second TCP connections by changing sequence numbers for packets being sent in both directions between the sender and the destination server.

5. The arrangement defined in claim 1 wherein the first device verifies a sequence number in a replied TCP ACK packet to verify the sender is legitimate.

6. The arrangement defined in claim 1 wherein the second device only receives traffic from verified sending devices.

7. The arrangement defined in claim 1 wherein the first device is an input/output (I/O) device.

8. The arrangement defined in claim 1 wherein the one or more security processing operations comprise one or more of a group consisting of: stateful firewall, NAT, VPN, DPI, and anti-virus.

9. The arrangement defined in claim 1 wherein the first device:
receives a TCP packet to initiate a first TCP connection from a sender to a destination server, the first device being separate from the destination server;
calculates a first SYN cookie;
sends a reply TCP SYN+ACK packet with the first SYN cookie;
receives a TCP ACK packet with a second SYN cookie; and
verifies a TCP sequence number in the second SYN cookie matches the first SYN cookie to verify the sender is legitimate.

10. The arrangement defined in claim 9 wherein the SYN cookie comprises a TCP sequence number, and the TCP sequence number is a hash or other cryptographic function of a timestamp and IP header information.

11. A method comprising:
receiving, at a first device that performs sender verification for new TCP connections, a TCP packet to initiate a first TCP connection from a sender to a destination server, the first device being separate from the destination server;
capturing session information comprising a first sequence number of the first TCP connection, run-time data indicative of an application type establishing the first TCP connection, and metadata that describes the first TCP connection;
calculating a first SYN cookie;
sending, by the first device, a reply TCP SYN+ACK packet with the first SYN cookie;
receiving, at the first device, a TCP ACK packet with a second SYN cookie;
verifying, by the first device, a TCP sequence number in the second SYN cookie matches the first SYN cookie to verify the sender is legitimate; and
if verifying is successful,
initiating, by a second device separate from the first device, a second TCP connection with the destination server, wherein the second device establishes the second TCP connection using the sender as the source of the second TCP connection including determining an offset based on a difference of the first sequence number and a second sequence number for the second TCP connection, and
passing, by the second device using the second TCP connection, packets between the sender and the destination server based on results of one or more security processing operations performed by the second device on contents of the packets using the session information captured by the first device, wherein the second device performs security processing operations for TCP connections following sender verification by the first device, and wherein the second device modifies the first sequence number for the TCP packets based on the offset.

12. The method defined in claim 11 wherein passing packets between the sender and the destination server comprises acting as a proxy to send packets from the sender to the destination server by changing TCP sequence numbers from one of the first and second TCP connections to match the other of the first and second TCP connections.

13. The method defined in claim 11 further comprising initiating a three-way TCP handshaking with the destination server.

14. The method defined in claim 11 further comprising dropping the packet if the TCP sequence number does not match the first SYN cookie.

15. The method defined in claim 11 wherein the SYN cookie comprises a TCP sequence number, and the TCP sequence number is a hash or other cryptographic function of a timestamp and IP header information.

16. An article of manufacture having one or more non-transitory computer readable storage media storing instructions which, when executed by first and second devices, cause a method to be performed, the method comprising:
receiving, at a first device that performs sender verification for new TCP connections, a TCP packet to initiate a first TCP connection from a sender to a destination server, the first device being separate from the destination server;
capturing session information comprising a first sequence number of the first TCP connection, run-time data indicative of an application type establishing the first TCP connection, and metadata that describes the first TCP connection;
calculating a first SYN cookie;

sending, by the first device, a reply TCP SYN+ACK packet with the first SYN cookie;

receiving, at the first device, a TCP ACK packet with a second SYN cookie;

verifying, by the first device, a TCP sequence number in the second SYN cookie matches the first SYN cookie to verify the sender is legitimate;

if verifying is successful, initiating, by a second device separate from the first device, a second TCP connection with the destination server, wherein the second device establishes the second TCP connection using the sender as the source of the second TCP connection including determining an offset based on a difference of the first sequence number and a second sequence number for the second TCP connection, and passing, by the second device using the second TCP connection, packets between the sender and the destination server based on results of one or more security processing operations performed by the second device on contents of the packets using the session information captured by the first device, wherein the second device performs security processing operations for TCP connections following sender verification by the first device, and wherein the second device modifies the first sequence number for the TCP packets based on the offset.

17. The article of manufacture defined in claim 16 wherein passing packets between the sender and the destination server comprises acting as a proxy to send packets from the sender to the destination server by changing TCP sequence numbers from one of the first and second TCP connections to match the other of the first and second TCP connections.

18. The article of manufacture defined in claim 16 wherein the method further comprises initiating a three-way TCP handshaking with the destination server.

19. The article of manufacture defined in claim 16 wherein the method further comprises dropping the packet if the TCP sequence number does not match the first SYN cookie.

20. The article of manufacture defined in claim 16 wherein the SYN cookie comprises a TCP sequence number, and the TCP sequence number is a hash or other cryptographic function of a timestamp and IP header information.

* * * * *

UNITED STATES PATENT AND TRADEMARK OFFICE
CERTIFICATE OF CORRECTION

PATENT NO. : 9,742,732 B2  
APPLICATION NO. : 13/794367  
DATED : August 22, 2017  
INVENTOR(S) : Yi Sun et al.

Page 1 of 1

It is certified that error appears in the above-identified patent and that said Letters Patent is hereby corrected as shown below:

On the Title Page

Item (71) Applicants, please delete the text "Choung-Yaw Michael Shieh" and insert the text
-- Choung-Yaw Shieh --

Item (72) Inventors, please delete the text "Choung-Yaw Michael Shieh" and insert the text
-- Choung-Yaw Shieh --

Signed and Sealed this
Twentieth Day of November, 2018

Andrei Iancu
*Director of the United States Patent and Trademark Office*